(12) United States Patent
Zarecky

(10) Patent No.: US 11,007,951 B1
(45) Date of Patent: May 18, 2021

(54) MOUNTING ASSEMBLY

(71) Applicant: National Creative Enterprises, Inc., Burnsville, MN (US)

(72) Inventor: Joshua George Zarecky, Carmel, IN (US)

(73) Assignee: National Creative Enterprises, Inc., Burnsville, MN (US)

( * ) Notice: Subject to any disclaimer, the term of this patent is extended or adjusted under 35 U.S.C. 154(b) by 0 days.

(21) Appl. No.: 16/804,692

(22) Filed: Feb. 28, 2020

(51) Int. Cl.
*B60R 11/02* (2006.01)
*F16M 11/08* (2006.01)
*F16M 13/02* (2006.01)
*B60R 11/00* (2006.01)
*B62B 5/00* (2006.01)
*F16M 11/04* (2006.01)

(52) U.S. Cl.
CPC ............. *B60R 11/00* (2013.01); *B62B 5/00* (2013.01); *F16M 13/02* (2013.01); *B60R 11/02* (2013.01); *B60R 2011/0003* (2013.01); *B60R 2011/0052* (2013.01); *B60R 2011/0066* (2013.01); *B60R 2011/0078* (2013.01); *B60R 2011/0085* (2013.01); *F16M 11/041* (2013.01); *F16M 11/08* (2013.01)

(58) Field of Classification Search
CPC ..... B60R 2011/0078; B60R 2011/0085; B60R 2011/0052; B60R 2011/0066; B60R 11/02; F16M 11/08; F16M 11/041; F16M 13/02
See application file for complete search history.

(56) References Cited

U.S. PATENT DOCUMENTS

| | | | | |
|---|---|---|---|---|
| 4,873,936 A | * | 10/1989 | Ponticelli | B60R 11/02 116/33 |
| 4,948,083 A | * | 8/1990 | McNaney, Jr. | A01K 91/08 248/289.11 |
| 7,431,027 B2 | * | 10/2008 | Carpenter | F41B 11/52 124/49 |
| 8,162,690 B2 | * | 4/2012 | Smith | B60R 25/00 439/537 |
| 8,376,777 B2 | * | 2/2013 | Smith | H02G 3/14 439/537 |
| D694,228 S | * | 11/2013 | Richter | D14/253 |
| 8,578,647 B2 | | 11/2013 | Storch et al. | |
| 8,695,957 B2 | | 4/2014 | Quintania et al. | |
| 9,604,580 B2 | * | 3/2017 | Boer | F16M 11/041 |
| 9,611,975 B2 | * | 4/2017 | Chinn | B60P 7/0815 |
| 9,869,423 B2 | * | 1/2018 | Khodapanah | B62J 11/00 |
| 9,944,217 B2 | | 4/2018 | Schroeder et al. | |
| 10,125,921 B2 | * | 11/2018 | Khodapanah | F16M 13/02 |
| 10,307,313 B2 | | 6/2019 | Schroeder et al. | |
| 10,655,656 B2 | * | 5/2020 | Franklin | F16B 1/00 |
| 10,782,596 B2 | * | 9/2020 | Wilson | F16M 13/02 |
| 10,918,227 B2 | * | 2/2021 | Ditges | F16M 13/022 |

(Continued)

*Primary Examiner* — Justin M Larson
(74) *Attorney, Agent, or Firm* — Thomas J. Nikolai; DeWitt LLP

(57) ABSTRACT

Mounting a device to a horizontal surface of a transport vehicle is achieved by connecting a latch post assembly to the horizontal surface and a receiver assembly to the device. The latch post assembly and the receiver assembly may then be mated together creating multiple zones of frictional contact and positive retention force preventing inadvertent decoupling of the latch post assembly and the receiver assembly.

20 Claims, 7 Drawing Sheets

(56) References Cited

U.S. PATENT DOCUMENTS

| | | | |
|---|---|---|---|
| 2006/0208139 A1* | 9/2006 | Mossman | F16M 11/12 |
| | | | 248/125.9 |
| 2007/0069093 A1* | 3/2007 | Graham | A61G 12/002 |
| | | | 248/231.71 |
| 2016/0025258 A1 | 1/2016 | Shannahan et al. | |
| 2016/0121798 A1* | 5/2016 | Lee | B60R 11/02 |
| | | | 224/483 |
| 2018/0032104 A1* | 2/2018 | Schatz | G06F 1/1683 |
| 2020/0063909 A1* | 2/2020 | Weng | F16M 13/02 |
| 2020/0272031 A1* | 8/2020 | Zhu | G03B 17/561 |
| 2020/0378546 A1* | 12/2020 | Painter | F16M 13/00 |
| 2021/0026409 A1* | 1/2021 | Miles | F16M 11/105 |

* cited by examiner

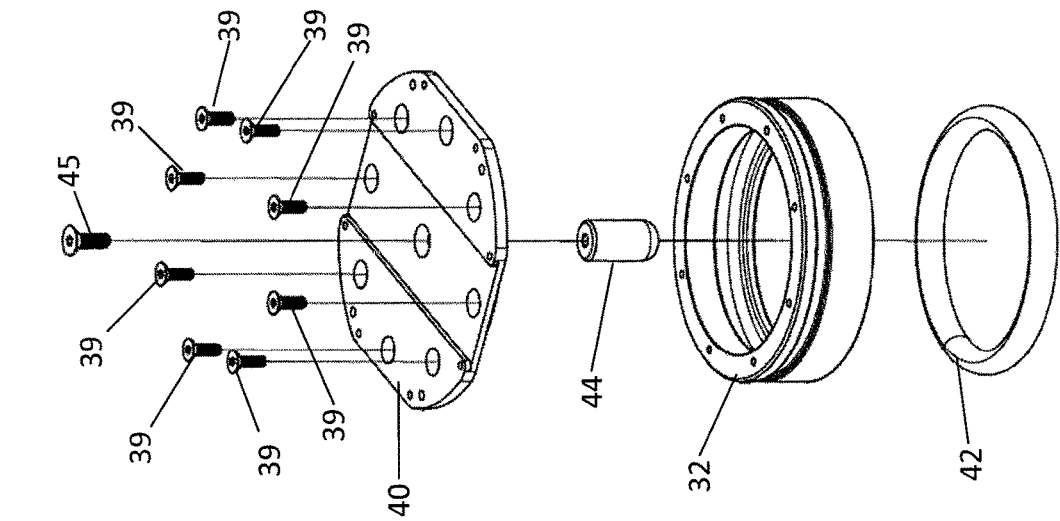

MOUNTING ASSEMBLY

CROSS-REFERENCED TO RELATED APPLICATIONS

Not applicable

STATEMENT REGARDING FEDERALLY SPONSORED RESEARCH OR DEVELOPMENT

Not applicable

BACKGROUND OF THE INVENTION

I. Field of the Invention

The present invention relates to equipment mounting systems, and more specifically systems for mounting medical equipment to a horizontal surface of a transport vehicle such as a cart or ambulance.

II. Discussion of the Prior Art

Any time equipment is transported via a transport vehicle precautions must be taken to secure the equipment. This is necessary to prevent damage to the equipment and to prevent the equipment from falling and causing injury.

Medical equipment such as ultrasound equipment, patient monitors and cardiac defibrillators are quite heavy and very expensive. Various mounting systems have been developed for mounting such a equipment to a vehicle, but these are not universal mounts and typically must be specifically adapted to accommodate the specific type of equipment, the specific type of vehicle, and the specific location of the vehicle where the equipment is to be mounted. These mounts make it difficult to reposition the equipment relative to the vehicle and the mounts typically must be reconfigured or adjusted to accommodate any such repositioning.

A need therefore exists for universal mounting systems that address each of the problems discussed above.

SUMMARY OF THE INVENTION

The foregoing problems are solved, at least with respect to mounting equipment to horizontal surfaces, by providing a universal mounting system comprising a latch post assembly adapted to be secured to a horizontal surface and be coupled to a receiver assembly adapted to be secured to the bottom of a piece of equipment.

The latch post assembly comprises a base plate and a post. The base plate has a first center section and a first outer section. The first center section may be recessed relative first outer section. The post projects from the top surface of the base plate at the first center section of the base plate. The post includes a side wall terminating in a flat top surface. The sidewall includes a concave surface extending around the post intermediate of the base plate and the flat top surface. The post also has a central channel open at the flat top surface. The first outer section of the base plate is adapted to enable the latch post assembly to be mounted to a horizontal surface. For example, there may be a series of screw holes associated with the outer section of the base plate so that the base plate may be bolted or screwed to a horizontal surface at any selected position along the horizontal surface.

The receiver assembly comprises an interface plate, a ring, a pin, and a spring. The interface plate has a second center section, an intermediate section and a second outer section. The pin projects in a first direction from second center section of the interface plate. The ring is positioned concentric with the pin and projects in the same direction as the pin from the intermediate section of the interface plate. The ring has an interior spring receiving zone. The spring is positioned within the interior spring receiving zone. The second outer section of the interface plate is adapted to enable the receiver assembly to be mounted to a piece of equipment. In some embodiments the receiver assembly may also have a plurality of support legs extending outwardly from the ring.

With the latch post assembly mounted to the horizontal surface, and the receiver assembly mounted to a piece of equipment, the latch post assembly and the receiver assembly are coupled together. More specifically, the latch post assembly and the receiver assembly are adapted to be coupled together so that the pin is received within the central channel of the post, the post is received within the ring and the spring is positioned within concave surface extending around the post and the interior spring receiving zone of the ring.

When multiple latch post assemblies are mounted to the horizontal surface(s) of a vehicle, the equipment can be quickly and easily repositioned by mating the receiver assembly attached to the equipment with a different selected latch post assembly. No tools are required to do so.

When the receiver assembly is mounted to a latch post assembly, various spring forces prevent these assemblies from becoming inadvertently decoupled. These forces provided by the spring compressed within the spring receiving zone of the ring between the circumferential surface inside the ring's spring receiving zone and the concave surface on the side wall of the post. The angled sections of the concave surface on the side wall of the post retain the receiver assembly by providing constant spring deflection with an increase in deflection and associated external vertical force required to disengage the latch mechanism and release the receiver assembly and attached equipment from the post assembly.

Further, the receiver assembly and a latch post assembly allow the equipment to be rotated to a desired viewing angle related to the horizontal surface. Frictional forces between the compressed spring and the vertical post in addition to the contact surface between the bottom face of the ring and the top surface of the mounting baseplate sufficiently prevent unintended rotation during use. When the legs are provided, they can include pads that allow the equipment to be put down on other intermediate work surface like the group or another table or work surface. The pads provide a sturdy support for the device which dampens vibration and resists sliding on wet or slippery surfaces.

BRIEF DESCRIPTION OF THE DRAWINGS

The foregoing features, objects and advantages of the invention will become apparent to those skilled in the art from the following detailed description of the preferred embodiment, especially when considered in conjunction with the accompanying drawings in which like numerals in the several views refer to corresponding parts:

FIG. 9 is a front view of the pin of the receiver assembly of the universal mount of FIG. 1.

FIG. 10 is a cross-sectional view of the pin of FIG. 9 taken through line D-D in FIG. 9.

FIG. 11 is a top view of the spring of the receiver assembly of the universal mount of FIG. 1.

FIG. 12 is a side view of the spring of the receiver assembly of the universal mount of FIG. 1.

FIG. 13 is a perspective exploded view of the receiver assembly of the universal mount of FIG. 1.

DESCRIPTION OF THE PREFERRED EMBODIMENT

Figure 1:
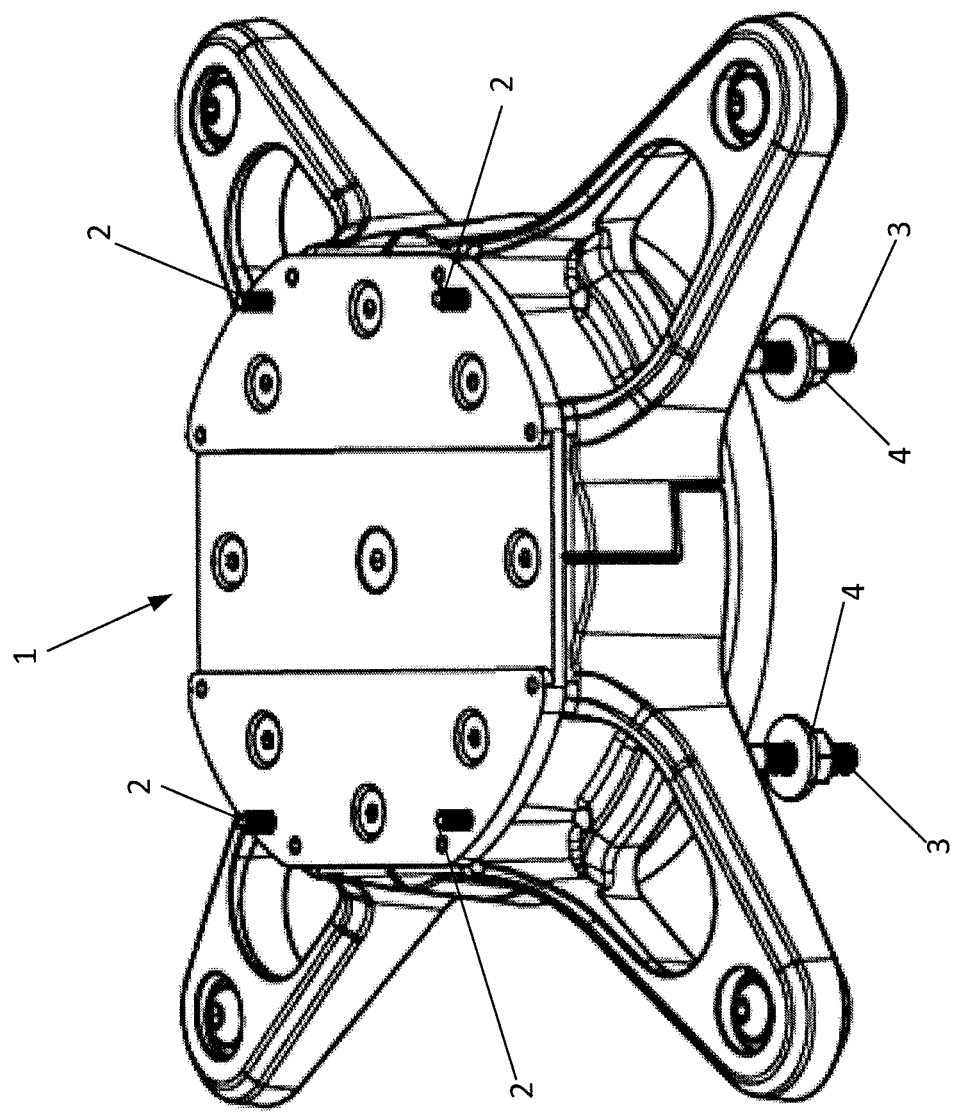
FIG. 1 is a perspective view of a universal mount made in accordance with the present invention.

This description of the preferred embodiments is intended to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

The drawings show an illustrative embodiment of a mounting assembly used to mount a piece of equipment (not shown) to a horizontal surface (not shown). The piece of equipment could, for example, be a defibrillator and the horizontal surface could be that of a cart, table or shelf such a those found in an ambulance or emergency medical services vehicle. The screws 2 shown in FIG. 1 are used to couple the mounting assembly 1 to the piece of equipment while the bolts 3 and nuts 4 are used to couple the mounting assembly 1 to the horizontal surface.

Figure 2:
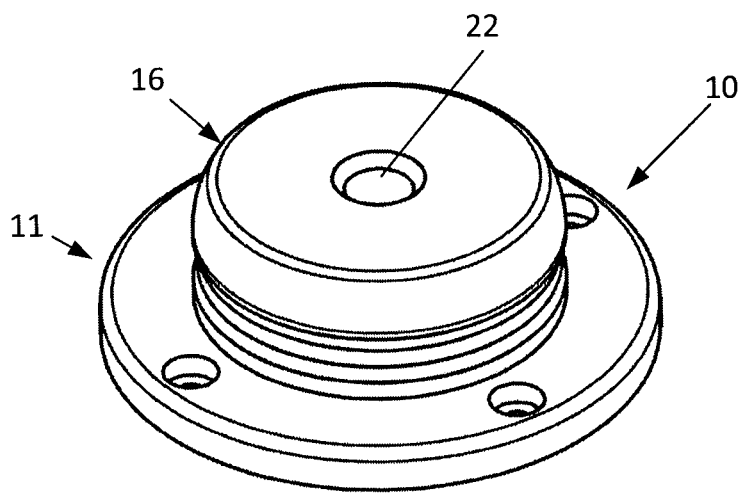
FIG. 2 is a perspective view of a latch post assembly of the universal mount of FIG. 1.
Figure 3:
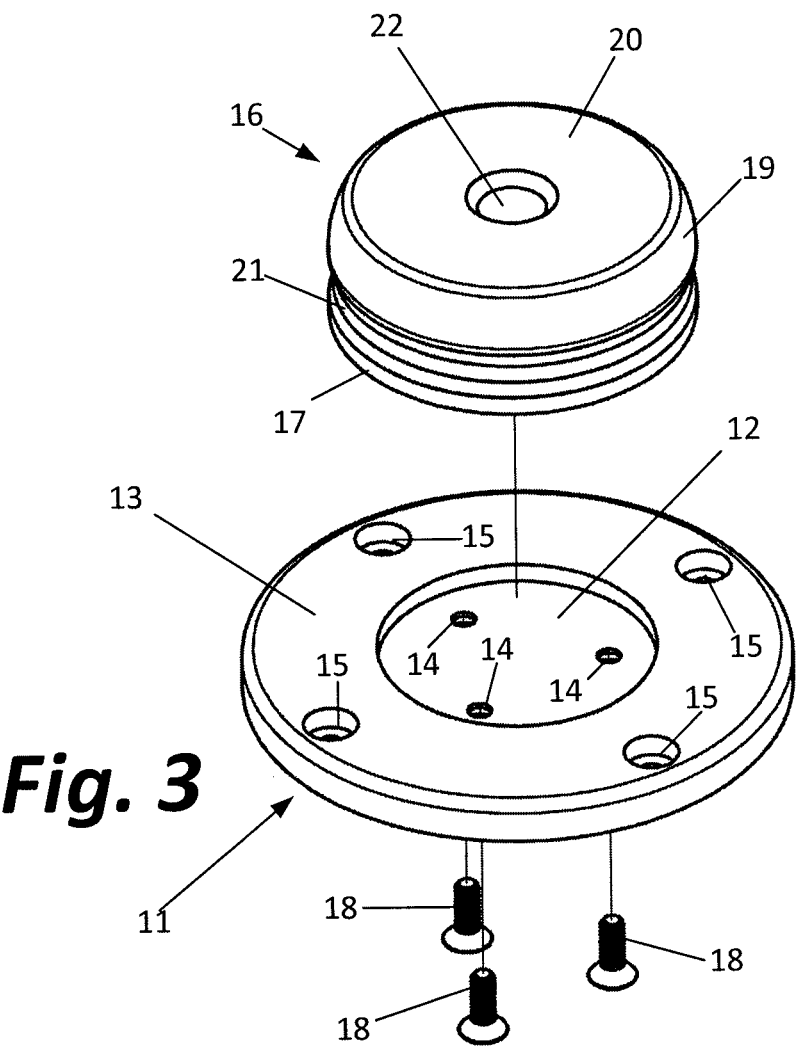
FIG. 3 is a perspective exploded view of the latch post assembly of FIG. 2.
Figure 14:
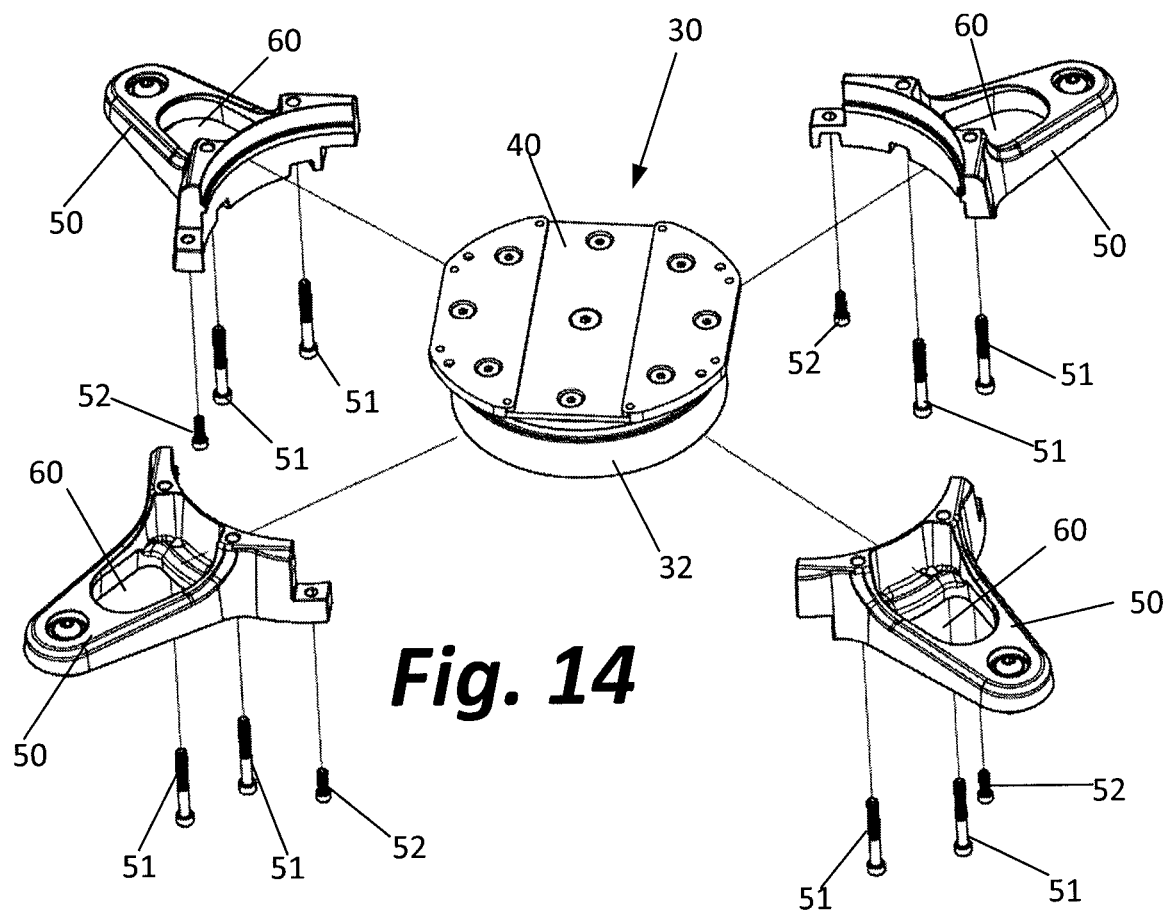
FIG. 14 is a perspective partially exploded view of the receiver assembly of the universal mount of FIG. 1.
Figure 15:
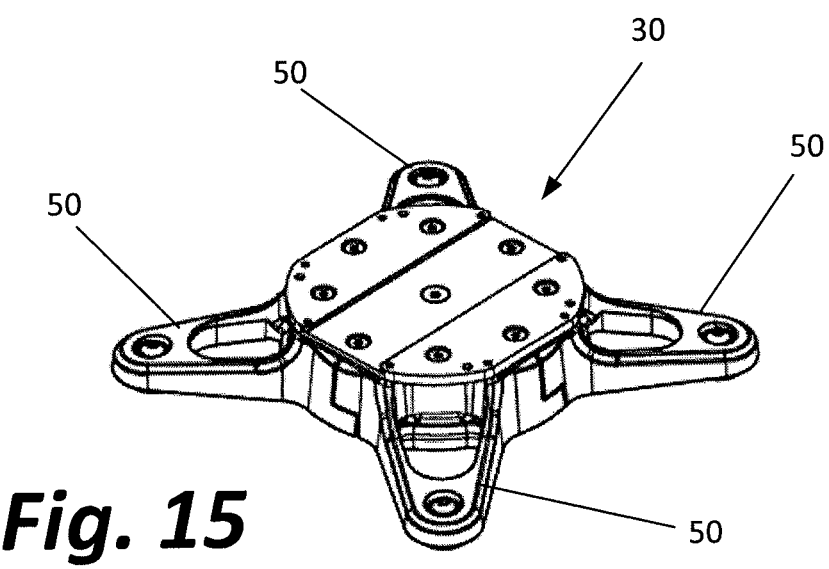
FIG. 15 is a perspective view of the receiver assembly of the universal mount of FIG. 1.

The mounting assembly 1 comprises two primary subassemblies, specifically a latch post assembly 10, shown in FIG. 2, adapted to be coupled to the horizontal surface by the bolts 3 and nuts 4 and a receiver assembly 30, shown in FIGS. 14 and 15, adapted to be coupled to a piece of equipment by the screws 2.

The latch post assembly 10 is best shown in FIGS. 2-6. The latch post assembly 10 comprises a base plate 11 having a recessed center section 12 and an outer section 13. The recessed center section 12 has three screw holes 14. The outer section has four screw holes 15.

The latch post assembly 10 further comprises a post 16. The post 16 has a bottom portion 17 adapted to be received within the recessed center section 12 of the base plate 11. When so positioned, threaded holes (not shown) in the bottom portion 17 of the post 16 are aligned with the holes 14 and screws 18 are then used to connect the post 16 to the base plate 11. The post 16 also has a side wall 19 terminating in a flat top surface 20.

Figure 4:
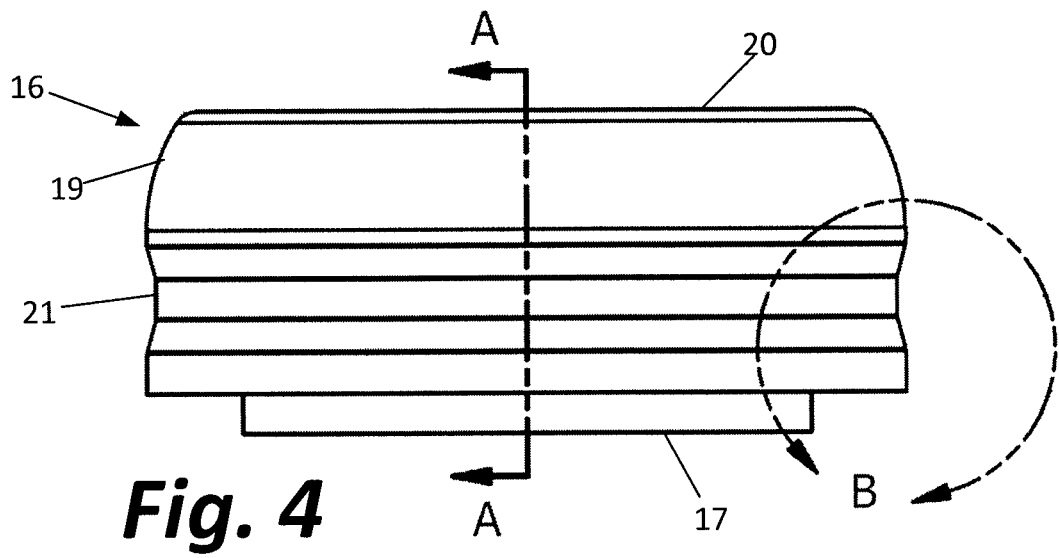
FIG. 4 is a plan view of the post of the latch post assembly of FIG. 2.
Figure 5:
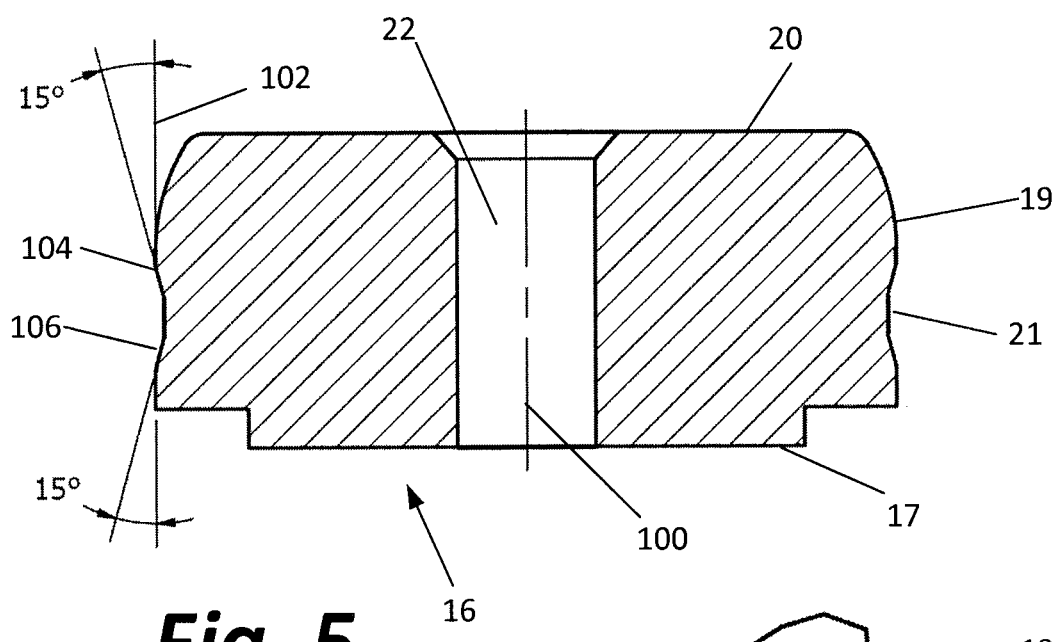
FIG. 5 is a cross-sectional view of the latch post of FIG. 4 taken through line A-A in FIG. 4.
Figure 6:
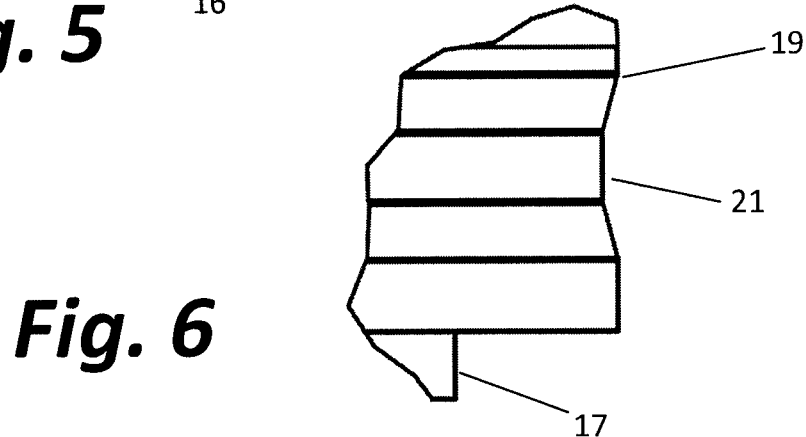
FIG. 6 is a detailed view of that portion of the posted of FIG. 4 labeled "B" in FIG. 4.
Figure 7:
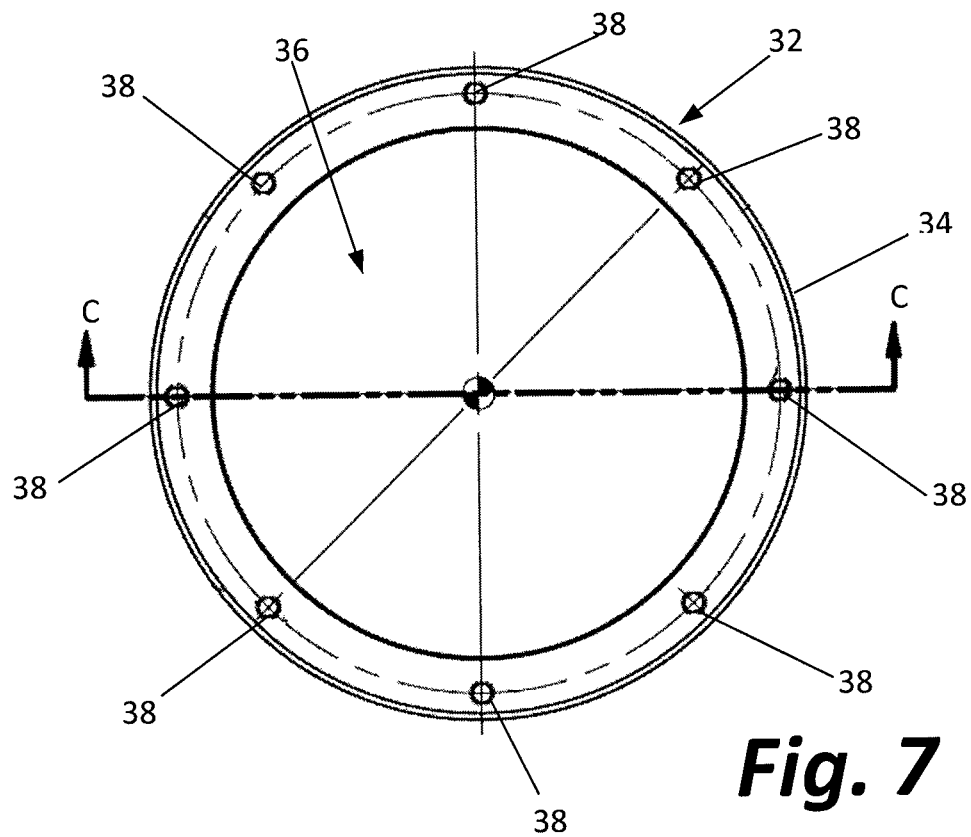
FIG. 7 is a top view of the ring of the receiver assembly of the universal mount of FIG. 1.
Figure 8:
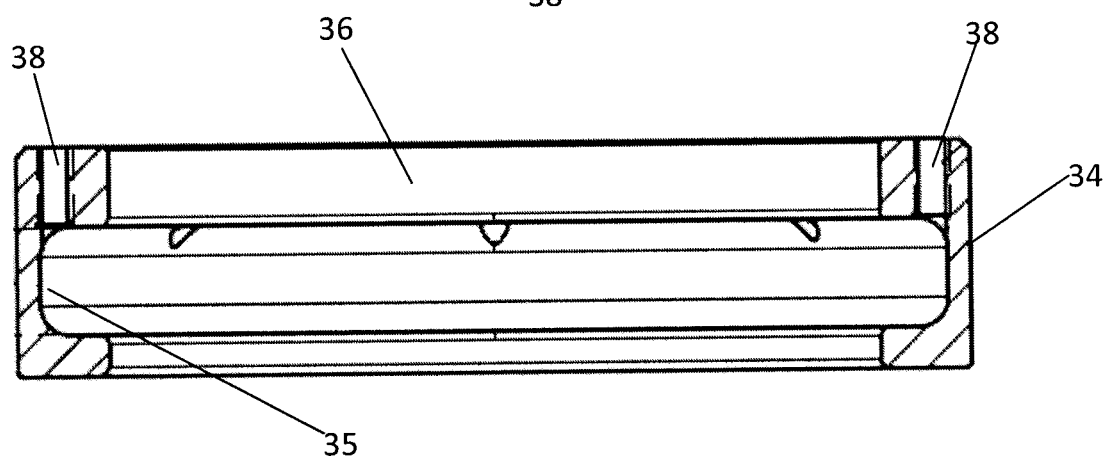
FIG. 8 is a cross-sectional view of the ring of the receiver assembly of FIG. 7 taken through line C-C in FIG. 7.

As best shown in FIGS. 4-6, the side wall 19 has a concave channel 21 extending around the post 16 intermediate and parallel to the top surface 20 and bottom portion 17 of the post. This concave surface 21 extending around the post 16 comprises an angled top surface 104 and an angled bottom surface 106. The post 16 has a longitudinal central axis 100. The angled top surface 104 and the angled bottom surface 106 each extent from a line 102 that is parallel to the longitudinal central axis 100 at an angle of 15 degrees.

The post 16 also has a central channel 22 open at the flat top surface 20.

When the mounting assembly 1 is used, the post 16 is first coupled to the base plate 11 as described above. The latch post assembly 11 is then coupled to the horizontal surface by aligning the holes 15 with corresponding holes in the horizontal surface, passing the bolts 3 through the aligned holes and then applying the nuts 4 to the bolts 3. Attachment means other than the nuts 4 and bolts 3 may be used without deviating from the invention.

The receiver assembly 30 is illustrated in FIGS. 7-15. The receiver assembly includes ring 32, best shown in FIGS. 7 and 8. The ring 32 comprises a side wall 34 surrounding a central opening 36. The top surface of the side wall 34 of the ring 32 has a plurality of spaced-apart screw holes 38. The screw holes 38 receive screws 39 to attach an interface plate 40 to the ring 32. The side wall 34 includes an interior spring receiving zone 35 adapted to receive and retain a spring 42.

The receiver assembly 30 also includes a pin 44. The pin 44 is mounted to the center of the interface plate 40 via screw 45 such that the pin 44 and ring 32 are concentric to each other and project in the same direction from the interface plate 40.

Figure 16:
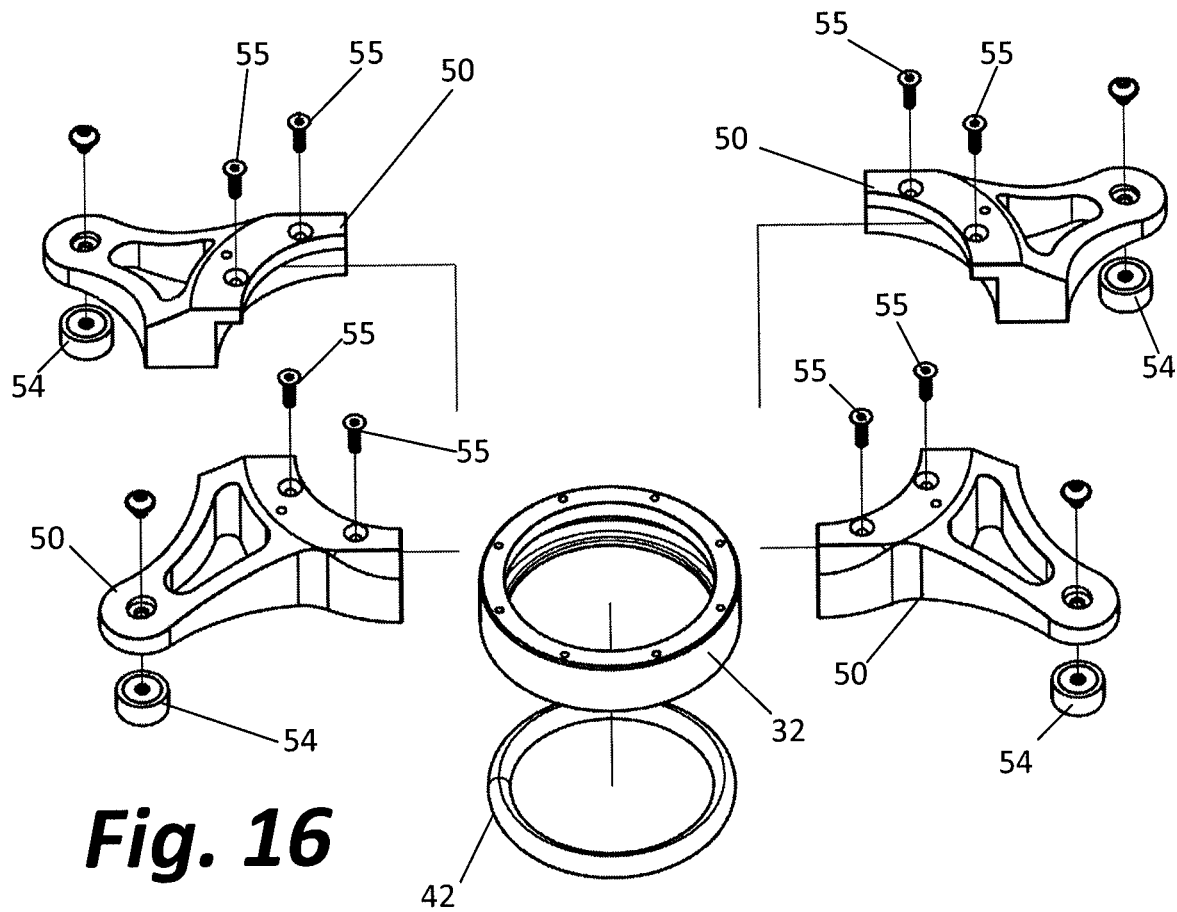
FIG. 16 is a perspective exploded view of an alternative receiver assembly.
Figure 17:
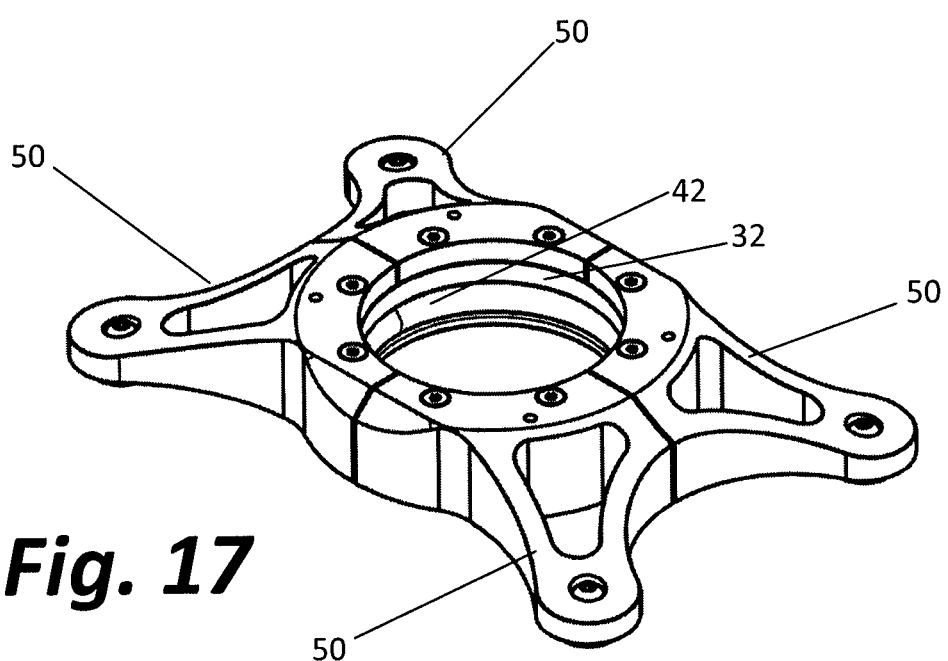
FIG. 17 is a perspective view of the receiver assembly of the universal mount of FIG. 17.

The receiver assembly 30 also includes four legs 50 projecting from the ring 32. The legs 50 may either be bolted directly to the ring 32, as shown in FIGS. 16 and 17, or to the interface plate, as shown in FIGS. 14 and 15 using bolts 51. In some embodiments a bolt 52 connects adjacent legs 50. A depending foot 54 may be attached to each leg 50. The legs 50 each have openings 60 to allow access to the screws 2 so that the receiver assembly may be easily attached to the bottom of a piece of equipment such as a defibrillator.

With the receiver assembly 30 attached to a device and the latch post assembly 10 attached to a horizontal surface, the mounting assembly 1 can be used to fix the device in place on the horizontal surface. Specifically, the ring 32 is positioned over the post 16 with the pin 44 centered over the central channel 22 of the post 16. The device is then lowered into place. As this occurs, the pin 44 enters the central channel 22 of the post 16 and the post 16 enters the ring 32. When the assembly is complete, the spring 42 resides within the concave channel 21 of the side wall 19 of the post 16 and the spring receiving zone 35 of the ring 32. The spring is slightly compressed to provide a holding force sufficient to couple together the latch post assembly 10 and the receiver assembly 30.

One advantage of the embodiment shown is that the receiver assembly 30 can swivel about the post 16 by a user applying a rotational force. When this force is removed, frictional forces between the spring 42 and post 16 inhibit further rotation.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. For mounting a device to a horizontal surface, a mounting assembly comprising:
   a) a latch post assembly comprising a base plate and a post, said base plate having a first center section and a first outer section, said post projecting from the first center section of the base plate, said post including a side wall terminating in a top surface, said sidewall including a concave surface extending around the post intermediate of the base plate and the top surface, said post having a central channel open at the top surface, said first outer section of the base plate adapted to enable the latch post assembly to be mounted to a horizontal surface;
   b) a receiver assembly comprising an interface plate, a ring, a pin and a spring, said interface plate having a second center section, an intermediate section and a second outer section, said pin projecting in a first direction from second center section of the interface plate, said ring positioned concentric with the pin and projecting in the same direction as the pin from the intermediate section of the interface plate, said ring having an interior spring receiving zone, said spring positioned within said interior spring receiving zone, and said second outer section of the interface plate adapted to enable the receiver assembly to be mounted to a device,
   wherein the latch post assembly and the receiver assembly are adapted to be coupled together so that the pin is received within the central channel of the post, the post is received within the ring and the spring is received in a space defined by the concave surface of the post and the interior spring receiving zone of the ring.

2. The mounting assembly of claim 1 further comprising a plurality of legs projecting outwardly from the ring.

3. The mounting assembly of claim 2 further comprising feet coupled to each of said legs.

4. The mounting assembly of claim 2 wherein each of said legs include openings extending therethrough.

5. The mounting assembly of claim 1 wherein said first outer section of the base plate includes a plurality of holes extending therethrough.

6. The mounting assembly of claim 1 wherein said second outer section of the interface plate includes a plurality of holes extending therethrough.

7. The mounting assembly of claim 1 wherein the top surface of the post is flat.

8. The mounting assembly of claim 1 wherein the said concave surface extending around the post comprises an angled top surface and an angled bottom surface.

9. The mounting assembly of claim 8 wherein the post has a longitudinal central axis and said angled top surface and said angled bottom surface each extent from a line parallel to the longitudinal central axis at an acute angle.

10. The mounting assembly of claim 1 wherein the first center section is recessed relative to the first outer section and said post has a bottom portion adapted to be received within the recessed first center section.

11. For mounting a device to a horizontal surface, a mounting assembly comprising:
    a) a latch post assembly comprising a base plate and a post, said base plate having a first center section and a first outer section, said post projecting from the first center section of the base plate, said post including a side wall terminating in a top surface, said sidewall including a concave surface extending around the post intermediate of the base plate and the top surface, said post having a central channel open at the top surface, said first outer section of the base plate adapted to enable the latch post assembly to be mounted to a horizontal surface;
    b) a receiver assembly comprising an interface plate, a ring, a pin, a spring, and a plurality of legs extending outwardly from said ring, said interface plate having a second center section, an intermediate section and a second outer section, said pin projecting in a first direction from second center section of the interface plate, said ring positioned concentric with the pin and projecting in the same direction as the pin from the intermediate section of the interface plate, said ring having an interior spring receiving zone, said spring positioned within said interior spring receiving zone, and said second outer section of the interface plate adapted to enable the receiver assembly to be mounted to a device,
    wherein the latch post assembly and the receiver assembly are adapted to be coupled together so that the pin is received within the central channel of the post, the post is received within the ring and the spring is received in a space defined by the concave surface of the post and the interior spring receiving zone of the ring.

12. The mounting assembly of claim 11 further comprising feet coupled to said legs.

13. The mounting assembly of claim 11 wherein each of said legs include openings extending therethrough.

14. The mounting assembly of claim 11 wherein said first outer section of the base plate includes a plurality of holes extending therethrough.

15. The mounting assembly of claim 11 wherein said second outer section of the interface plate includes a plurality of holes extending therethrough.

16. The mounting assembly of claim 11 wherein the top surface of the post is flat.

17. The mounting assembly of claim 11 wherein the said concave surface extending around the post comprises an angled top surface and an angled bottom surface.

18. The mounting assembly of claim 17 wherein the post has a longitudinal central axis and said angled top surface and said angled bottom surface each extent from a line parallel to the longitudinal central axis at an acute angle.

19. The mounting assembly of claim 11 wherein the first center section is recessed relative to the first outer section and said post has a bottom portion adapted to be received within the recessed first center section.

20. A method for mounting a device to a horizontal surface comprising the steps of:
    a) attaching a latching assembly to a horizontal surface, said latching assembly comprising a base plate and a post, said base plate having a first center section and a first outer section, said post projecting from the first center section of the base plate, said post including a side wall terminating in a top surface, said sidewall including a concave surface extending around the post intermediate of the base plate and the top surface, said post having a central channel open at the top surface, said first outer section of the base plate adapted to enable the latch post assembly to be mounted to a horizontal surface;

b) attaching a receiver assembly to a device, said receiver assembly comprising an interface plate, a ring, a pin, a spring, and a plurality of legs extending outwardly from said ring, said interface plate having a second center section, an intermediate section and a second outer section, said pin projecting in a first direction from second center section of the interface plate, said ring positioned concentric with the pin and projecting in the same direction as the pin from the intermediate section of the interface plate, said ring having an interior spring receiving zone, said spring positioned within said interior spring receiving zone, and said second outer section of the interface plate adapted to enable the receiver assembly to be mounted to a device;

c) coupling together the latch post assembly and the receiver assembly so that the pin is received within the central channel of the post, the post is received within the ring and the spring is received in a space defined by the concave surface of the post and the interior spring receiving zone of the ring.

\* \* \* \* \*